(No Model.)  2 Sheets—Sheet 1.

S. W. PUTNAM.
Boring Machine.

No. 240,458.  Patented April 19, 1881.

Witnesses:
J. Walter Fowler
C. E. Birckhead

Inventor;
Salmon W. Putnam
per atty
A. H. Evans & Co.

(No Model.)  2 Sheets—Sheet 2.

S. W. PUTNAM.
Boring Machine.

No. 240,458.  Patented April 19, 1881.

Witnesses:
J. Walter Fowler,
R. K. Evans

Inventor:
Salmon W. Putnam
per attys
A. H. Evans & Co.

UNITED STATES PATENT OFFICE.

SALMON W. PUTNAM, OF FITCHBURG, MASSACHUSETTS.

BORING-MACHINE.

SPECIFICATION forming part of Letters Patent No. 240,458, dated April 19, 1881.

Application filed December 9, 1880. (No model.)

*To all whom it may concern:*

Be it known that I, SALMON W. PUTNAM, of Fitchburg, county of Worcester, and State of Massachusetts, have invented a new and useful Improvement in Boring-Machines, of which the following is a clear, full, and exact description, reference being had to the accompanying drawings, making a part of this specification, in which—

Figure 1:
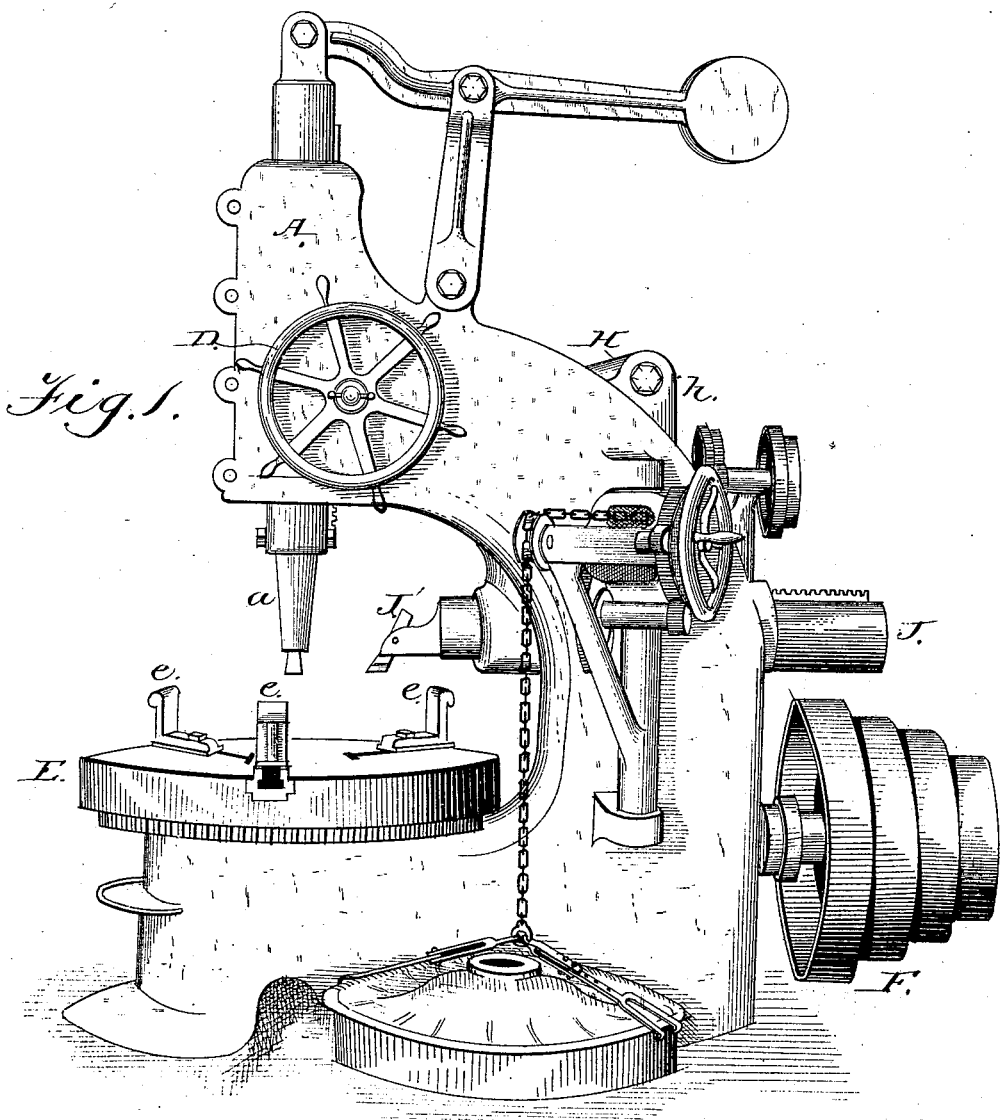
Figure 2:
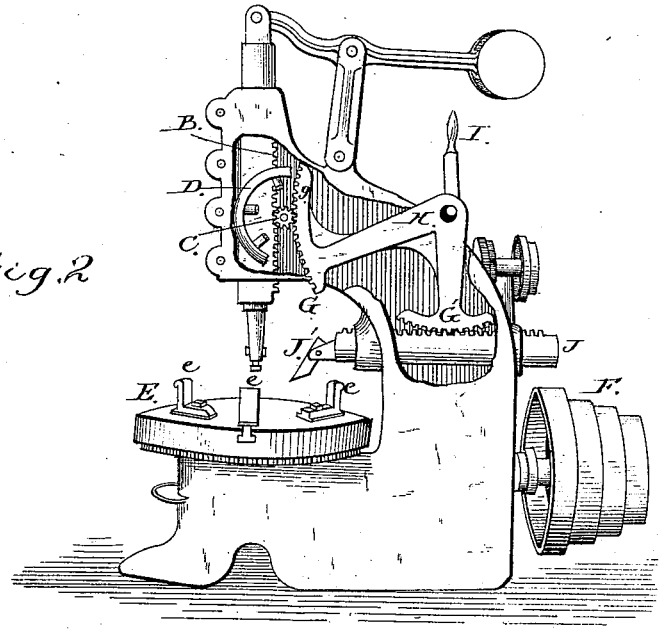
Figure 3:
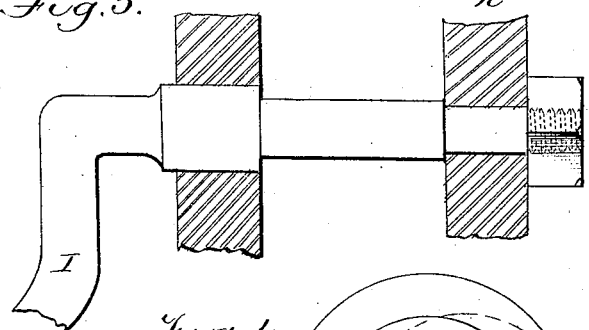
Figure 4:
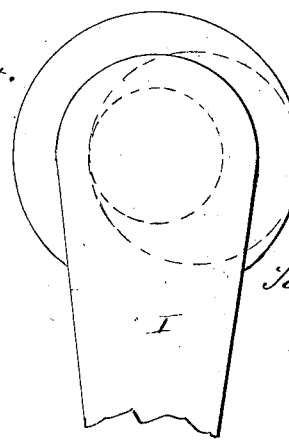

Figure 1 is a side elevation of my machine. Fig. 2 is a partial vertical section of the same. Figs. 3 and 4 are details to be referred to.

To enable others skilled in the art to make and use my invention, I will proceed to describe the exact manner in which I have carried it out.

The object of my invention is to effect the facing of a car-wheel at the same time the hub is being bored; and it consists in combining in the boring-machine the facing-tool to be automatically operated during the process of boring.

In the drawings, A represents a boring-machine carrying the boring-spindle $a$ in the usual manner. This spindle is raised or lowered upon the revolving hub by means of the rack B and toothed pinion C, operated by the hand-wheel D.

The wheel to be bored and faced is secured upon the revolving chuck E and held centrally by means of the jaws $e$. The chuck is revolved by gearing with the large cone-pulley F, the power being transmitted to the chuck through a shaft and bevel-gearing.

The segment-gear G is connected by a bell-crank, H, which swings between two horns, $h$, cast solid on the rear side of the machine, as shown in Fig. 3. This crank is pivoted to an eccentric handle, I, by means of which the segment is readily thrown out of gear with the pinion C when the facing attachment is not required. The portion $g$ of the segment-gear which meshes with the pinion C is caused to move up or down as the pinion is turned. It is evident from this description that as the boring-spindle is lowered by the pinion the segment $g$ will rise, and, by means of the crank-connection, the segment G' will be caused to advance toward the work, and with it carry the horizontal facing-spindle J and facing-tool J', thus causing the facing-spindle to operate simultaneously with the vertical or boring spindle, both in its advancing and receding movements, and in the same time heretofore required to operate the boring-spindle separately or alone.

Having thus described my invention, what I claim as new, and desire to secure by Letters Patent, is—

1. The combination of a boring-spindle and facing-spindle with the pinion C and segment-gear G, substantially as and for the purpose described.

2. The combination of a boring-spindle and a facing-spindle with the segment-gear journaled on a revoluble eccentric shaft, substantially as and for the purpose described.

3. The combination, in a machine having a rotary work-supporting table, of a boring-tool and a planing-tool carried, respectively, by a boring-arbor and a cutting-stock, the latter operated by and simultaneously with the former, substantially as described.

SALMON W. PUTNAM.

Witnesses:
GEO. A. WILSON,
GEORGE E. PUTNAM.